(12) United States Patent
Boutwell

(10) Patent No.: US 10,287,038 B2
(45) Date of Patent: May 14, 2019

(54) SYSTEM AND METHOD FOR FILLING SANDBAGS

(71) Applicant: James C. Boutwell, Wheaton, IL (US)

(72) Inventor: James C. Boutwell, Wheaton, IL (US)

( * ) Notice: Subject to any disclaimer, the term of this patent is extended or adjusted under 35 U.S.C. 154(b) by 222 days.

(21) Appl. No.: 15/604,914

(22) Filed: May 25, 2017

(65) Prior Publication Data

US 2017/0341785 A1     Nov. 30, 2017

Related U.S. Application Data

(60) Provisional application No. 62/343,194, filed on May 31, 2016.

(51) Int. Cl.
| | |
|---|---|
| *B65B 67/02* | (2006.01) |
| *B65B 1/12* | (2006.01) |
| *B65G 33/14* | (2006.01) |
| *B65G 65/22* | (2006.01) |

(52) U.S. Cl.
CPC ............ *B65B 1/12* (2013.01); *B65B 67/02* (2013.01); *B65G 33/14* (2013.01); *B65G 65/22* (2013.01)

(58) Field of Classification Search
CPC .. B65B 1/04; B65B 1/12; B65B 67/02; B65G 33/14; B65G 33/16; B65G 33/18; B65G 65/16; B65G 65/22
See application file for complete search history.

(56) References Cited

U.S. PATENT DOCUMENTS

| | | | | | |
|---|---|---|---|---|---|
| 2,045,757 | A | * | 6/1936 | Constantin ............. | B65G 33/00 198/657 |
| 2,569,871 | A | * | 10/1951 | Roscoe .................. | B65G 65/22 198/674 |
| 3,727,746 | A | * | 4/1973 | Slusher .................. | B65G 33/02 198/659 |
| 3,949,863 | A | * | 4/1976 | Lippi ................... | A01K 5/0258 198/666 |
| 4,184,522 | A | * | 1/1980 | Waite ....................... | B65B 1/00 141/231 |
| 4,763,702 | A | * | 8/1988 | High, Jr. ................... | B65B 1/12 141/114 |
| 5,099,986 | A | * | 3/1992 | Kuzub .................... | B65G 33/16 198/659 |
| 5,353,851 | A | * | 10/1994 | Cline ....................... | B65B 1/12 141/256 |

(Continued)

*Primary Examiner* — Nicolas A Arnett
(74) *Attorney, Agent, or Firm* — McAndrews, Held & Malloy, Ltd.

(57) ABSTRACT

An apparatus for filling sandbags includes a hollow housing tube, an auger, and a motor. The hollow housing tube includes an intake end, a curved central portion, and a discharge end. The hollow housing tube includes a discharge chute at the discharge end. The auger includes a shaft and flightings. The auger is at least partially disposed within the hollow housing tube. The auger includes a first end connected to a motor at the discharge end of hollow housing tube and a second end connected to a sand screw auger bit at the intake end of the housing tube. The auger includes a plurality of connected auger sections. A portion of the plurality of connected auger sections is disposed in the curved central portion of the hollow housing tube and is flexibly connected. The motor is operable to transmit rotational torque through an entire length of the auger.

20 Claims, 7 Drawing Sheets

(56) References Cited

U.S. PATENT DOCUMENTS

| | | | | |
|---|---|---|---|---|
| 5,901,762 A * | 5/1999 | Rollins | ............... | B65B 1/12 |
| | | | | 141/231 |
| 5,947,347 A * | 9/1999 | Cline, Sr. | ............... | B60P 1/42 |
| | | | | 141/313 |
| 5,988,237 A * | 11/1999 | Bedsole | ............... | B65B 1/12 |
| | | | | 141/114 |
| 6,237,309 B1 * | 5/2001 | DeMarco | ............... | B65B 1/12 |
| | | | | 141/231 |
| 8,100,301 B2 * | 1/2012 | Babiarz | ............... | B65B 1/12 |
| | | | | 141/231 |
| 9,010,382 B2 * | 4/2015 | Matye | ............... | B65B 1/06 |
| | | | | 141/103 |
| 2010/0282780 A1 * | 11/2010 | Babiarz | ............... | B65B 1/12 |
| | | | | 222/226 |
| 2013/0048148 A1 * | 2/2013 | Matye | ............... | B65B 1/06 |
| | | | | 141/99 |

* cited by examiner

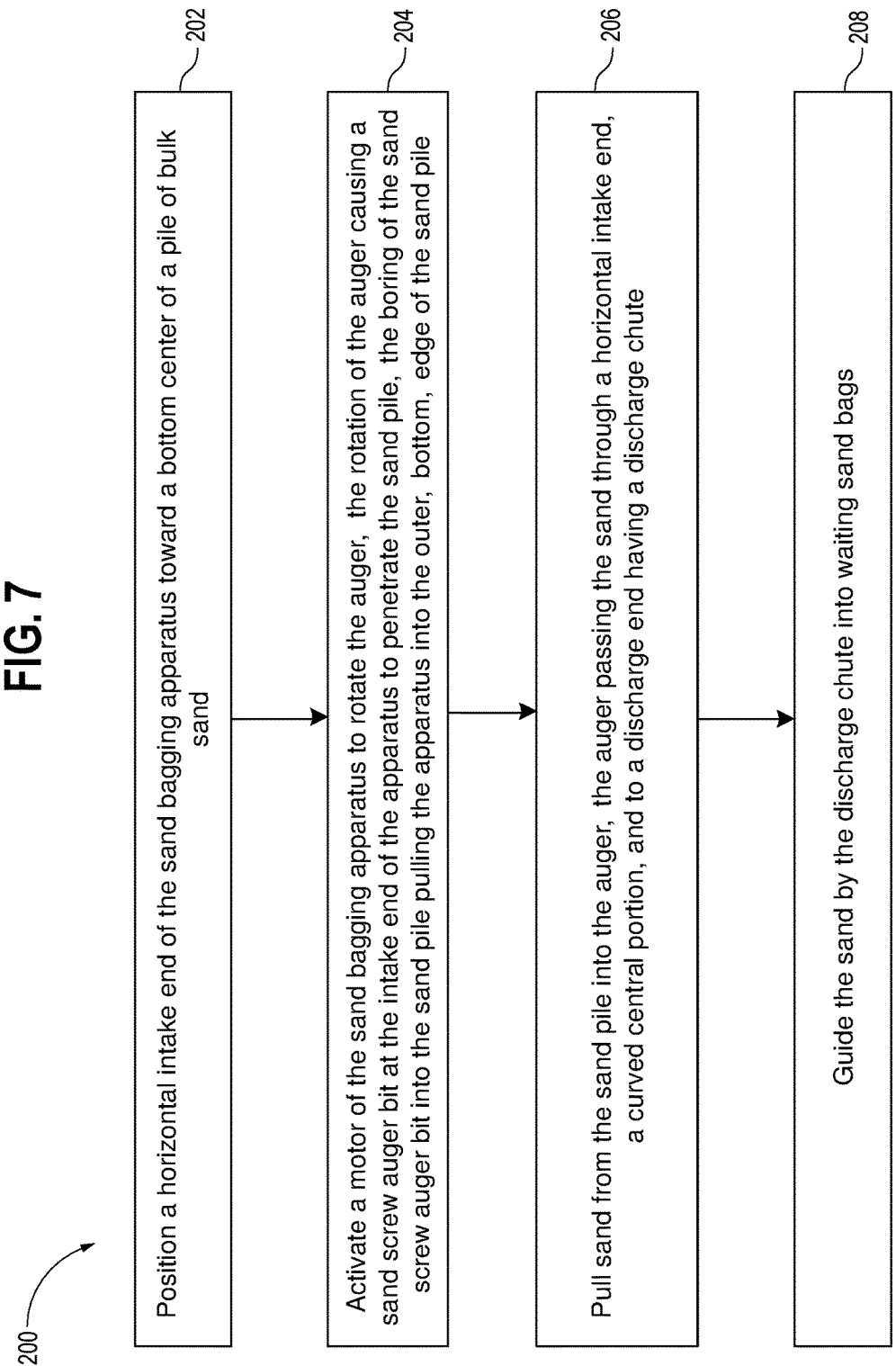

SYSTEM AND METHOD FOR FILLING SANDBAGS

CROSS-REFERENCE TO RELATED APPLICATIONS/INCORPORATION BY REFERENCE

The present application claims priority under 35 U.S.C. § 119(e) to provisional application Ser. No. 62/343,194, filed on May 31, 2016. The above referenced provisional application is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD

Certain embodiments relate to systems and methods for filling sandbags. More specifically, certain embodiments provide a power assisted portable sand bagging apparatus having a curved auger assembly operable to pull sand from a sand pile at an intake end of the apparatus to a discharge chute at a discharge end of the apparatus to fill waiting sandbags.

BACKGROUND

An auger is a mechanism used to move liquid or granular materials. For example, augers are often found in the agricultural industry for moving seed and feed. Augers typically include a spiral blade, referred to as flighting, coiled around a shaft. These augers move the material in a straight line and are often positioned horizontally or at an incline. The lack of flexibility of the straight auger shaft may not be desirable in various applications.

Coreless or shaftless augers are known and provide the added benefit of being flexible, as opposed to straight. Coreless augers, however, are typically not as strong as augers having shafts. Consequently, coreless augers are often used to move light material and may not be practical for moving dense materials like sand, for example. Specifically, heavier materials may provide additional drag on the auger that may stretch or otherwise temporarily deform the auger. The unpredictable nature of the deformation of the coreless auger when used with heavier materials may not be desirable.

Existing sand bagging devices typically require that the bulk sand be elevated by a front-end loader into a waiting hopper before being fed into the auger. Front-end loaders and hoppers are expensive and not readily available, particularly during a flooding emergency when such units may be in high demand. The use of front-end loaders also introduces additional risk, particularly when operated on uneven surfaces. In some cases, the intake of sand into an existing sand bagging device may require additional power sources, silos, vibrators, secondary augers, or the like, which add undesirable cost and complexity to the sand bagging device.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

Systems and methods for filling sandbags by modular connected auger sections disposed in at least a partially curved housing are provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 2A is a detail view of an exemplary hexagon-shaped rod driven by a motor and joining neighboring auger sections in accordance with various embodiments.

FIG. 7 is a flow diagram that illustrates exemplary steps for filling sandbags by a sand bagging apparatus in accordance with various embodiments.

DETAILED DESCRIPTION

Figure 1:
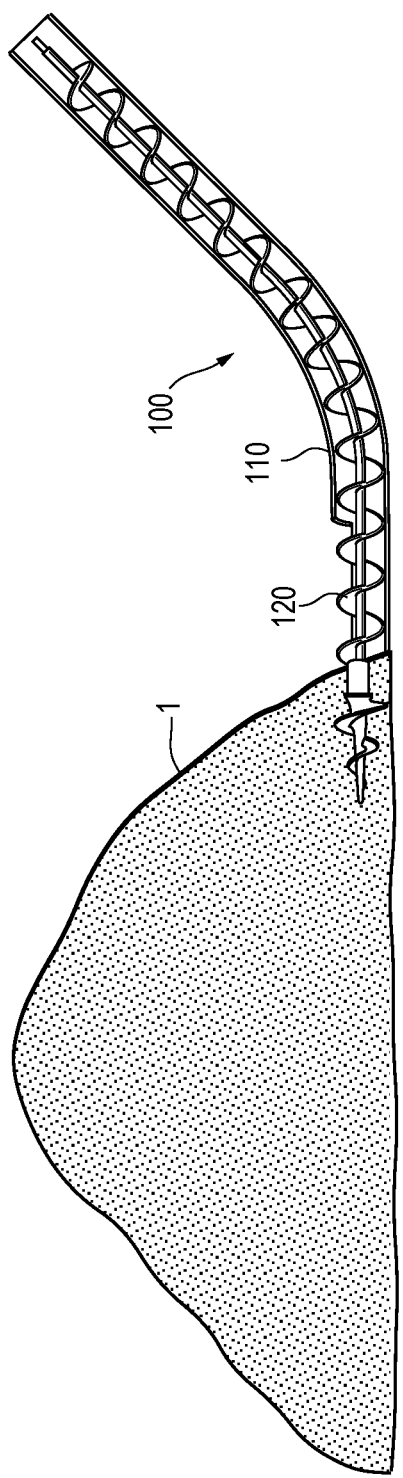
FIG. 1 is a side elevation view of an exemplary sand bagging apparatus as the apparatus is boring itself into the bottom of a pile of sand in accordance with various embodiments.

Certain embodiments may be found in systems 100 and methods 200 for filling sandbags. More specifically, certain embodiments provide sand bagging apparatus or system 100 having an at least partially curved housing 110 with interconnected modular auger sections 120 disposed therein. The auger 120 of the sand bagging apparatus 100 may be operable to bore into a pile of sand 1 at ground level, pulling the sand up through the at least partially curved housing 110 from an intake end 111 to a discharge end 112 of the apparatus 100. The sand is guided by a discharge chute 113 at the discharge end 112 of the apparatus 100 into waiting bags.

As used herein, the terms "exemplary" and "example" mean serving as a non-limiting example, instance, or illustration. As used herein, the term "e.g." introduces a list of one or more non-limiting examples, instances, or illustrations.

Although certain embodiments in the foregoing description may be described as moving sand, for example, unless so claimed, the scope of various aspects of the present disclosure should not be limited to sand and may additionally and/or alternatively be applicable to granular material, liquid, or any suitable material.

As used herein, an element recited in the singular and proceeded with the word "a" or "an" should be understood as not excluding the plural of the elements, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

FIG. 1 is a side elevation view of an exemplary sand bagging apparatus 100 as the apparatus 100 is boring itself into the bottom of a pile of sand 1 in accordance with various embodiments. Referring to FIG. 1, the exemplary sand bagging apparatus 100 comprises an auger 120 and a housing 110. The housing 110 may surround all but an initial portion of the auger 120. In various embodiments, the initial portion may be approximately 2 feet or any suitable length, such as 1 to 5 feet, for example. The initial portion of the housing 110 may extend under the pile of sand 1. The initial portion of the housing 110 may enhance the boring ability of the auger 120 and allow the appropriate amount of sand 1 to fall into the rotating auger 120. In an exemplary embodiment, the apparatus may convey bulk sand 1 from ground level to an elevated height, such as approximately 4 feet above ground or any suitable height for facilitating the bagging of the sand 1. In various embodiments, the auger 120 may operate at 100 rpm to convey approximately 2 cubic feet per minute, or approximately a 45 pound bag every 15 seconds. For reference, depending on moisture content, sand may be roughly 90 pounds per cubic foot.

Figure 2:
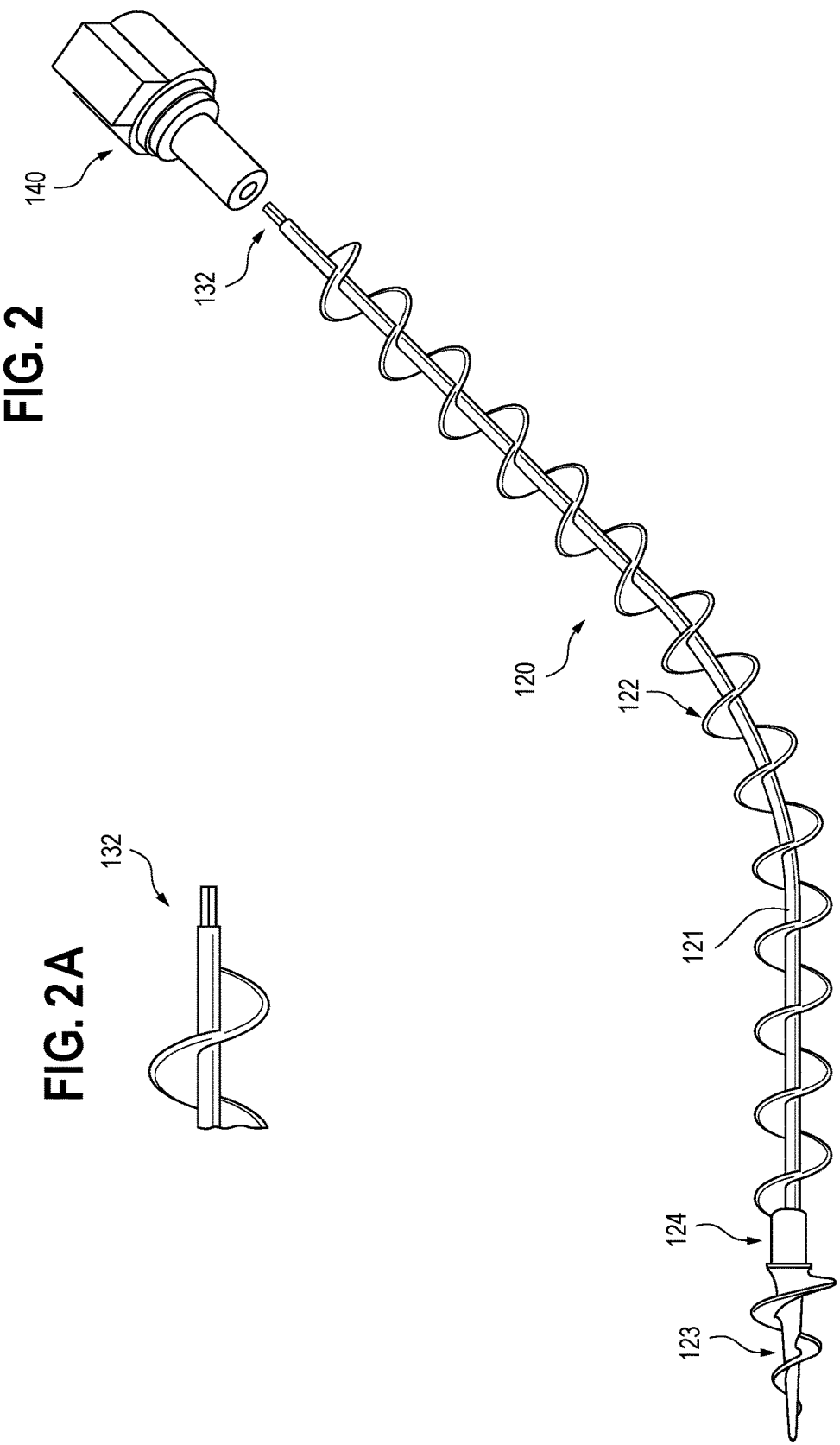
FIG. 2 is a side elevation view of exemplary internal components of a sand bagging apparatus in accordance with various embodiments.

FIG. 2 is a side elevation view of exemplary internal components of a sand bagging apparatus 100 in accordance with various embodiments. Referring to FIG. 2, the sand bagging apparatus 100 comprises an auger 120 driven by a motor 140. The motor 140 may be located at the discharge end 112 of the auger 120. The auger 120 is connected to, and powered by, the motor 140. In various embodiments, the motor 140 may be a variable speed, reversible, 1.5 horsepower electric drive assembly, a hydraulic motor (e.g., powered by a power take-off, which in turn is powered by a motorized vehicle), or any suitable motor.

The auger 120 is comprised of modular auger sections, each having a shaft or core 121 and flightings 122. In various embodiments, the outer diameter of the flightings may be 5 inches, or any suitable diameter. In an exemplary embodiment, each modular auger section is 4 inches long, or any suitable length. The auger 120 may be made of High Density Polyethylene (HDPE), or any suitable material. The core 121 of the auger 120 may be hollow. In various embodiments, the hollow core 121 may be hexagon shaped, as opposed to a round shape, for example. The inner diameter from flat-to-flat of the hexagon shaped hollow core 121 of the auger 120 may be 1.375 inches, or any suitable inner diameter.

Figure 3:
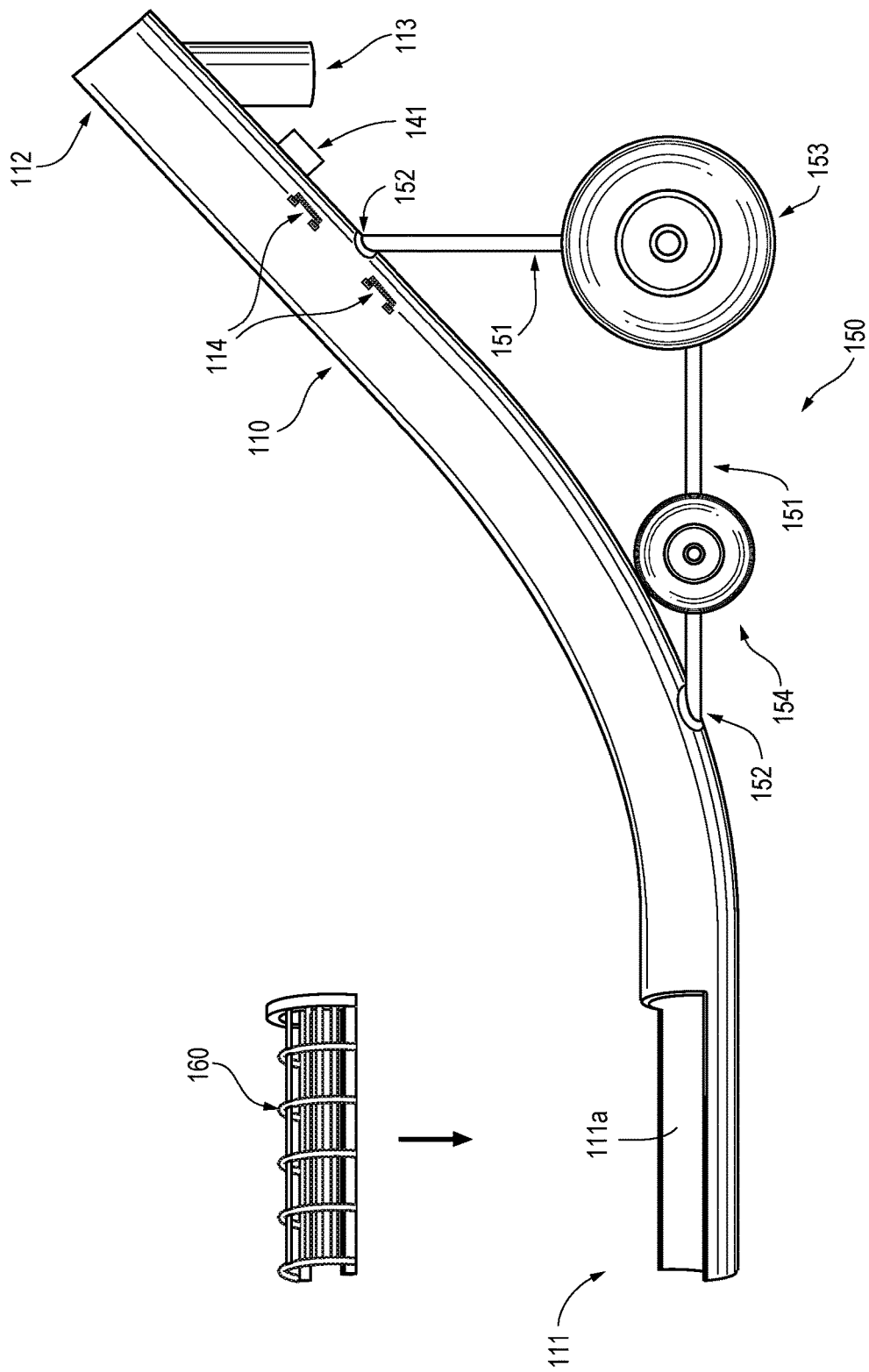
FIG. 3 is a side elevation view of exemplary exterior components of a sand bagging apparatus in accordance with various embodiments.
Figure 4:
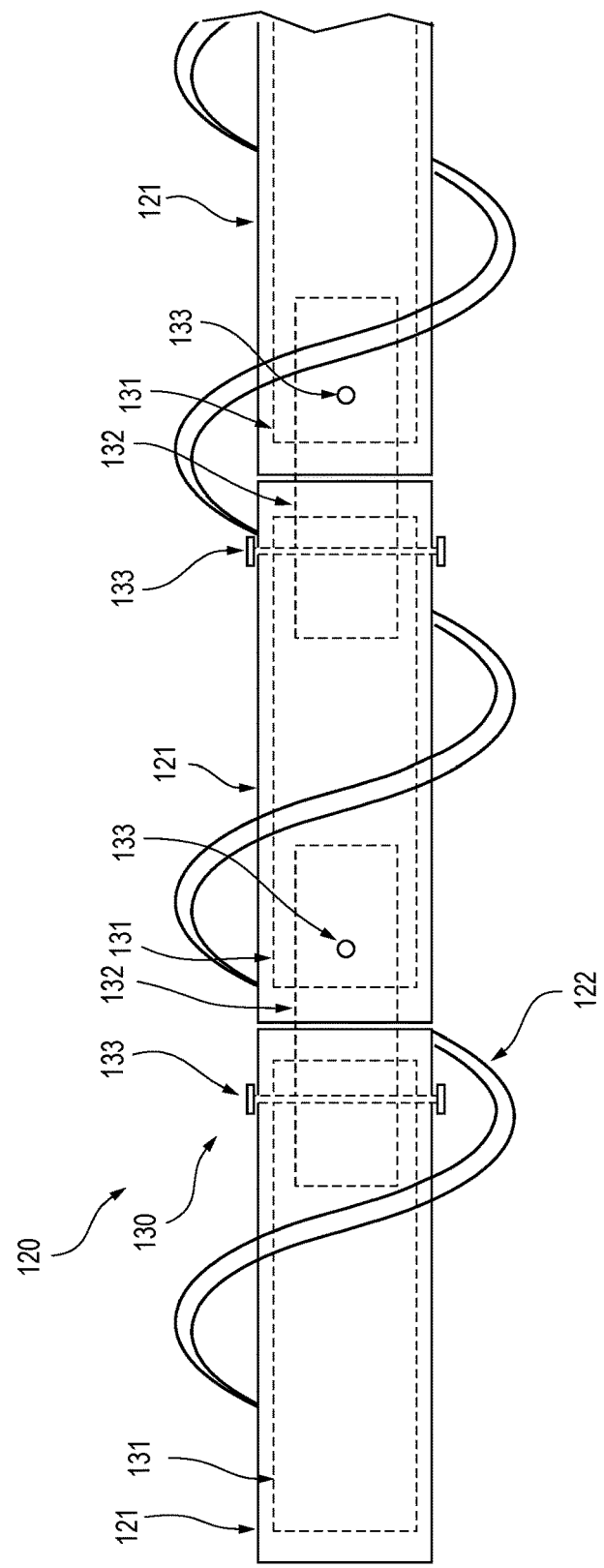
FIG. 4 is a side sectional view of the intersection of auger segments in accordance with various embodiments.

In various embodiments, the auger 120 is configured to conform to the gentle curve in a portion of the auger's housing 110, as illustrated in FIG. 3 and described below. For example, as shown in FIG. 4 and described below, the auger sections 120 may be optionally slid onto a hex rod tube 131. The hex rod tube 131 may be a hexagon-shaped hollow tube. The hex rod tube 131 may be a galvanized metal tube or any suitable material. The outer diameter of the hex rod tube 131 may substantially match the inner diameter of the auger sections (e.g., 1.375 inches or any suitable diameter). The hex rod tubes 131 of neighboring auger sections 120 and/or the neighboring auger sections 120 themselves (e.g., without the hex rod tubes 131) may be joined by a hexagon-shaped rod 132. FIG. 2A is a detail view of an exemplary hexagon-shaped rod 132 driven by a motor 140 and joining neighboring auger sections 120 in accordance with various embodiments. The hex rod 132 may be solid metal, HDPE, or any suitable material. The hex rods 132 may each be approximately 3 inches long, or any suitable length such that the hex rods 132 extend approximately 1.5 inches into neighboring auger sections 120 and/or the hex rod tubes 131 of adjacent auger sections 120. In an exemplary embodiment without the hex rod tubes 131, the hex rods 132 may have an outside diameter (e.g., flat surface-to-flat surface) that is slightly less than the inside diameter (e.g., flat surface-to-flat surface) of the auger section 120 to allow for a slight articulation at each segment. For example, if the inner diameter from flat-to-flat of the hexagon shaped hollow core 121 of the auger is 1.375 inches, the outer diameter of the hex rods 132 may be approximately 1.25 inches (defined at 1.000 to 1.325 inches), or any suitable outer diameter. The end surfaces of each of the auger sections may slide and flex against adjoining auger sections to provide the curved section of the auger 120.

Aspects of the present disclosure provide that the auger 120 is operable to convey bulk material along both a straight line and a curve. The rotational torque provided by the motor 140 at the discharge end 112 of the auger 120 is transmitted through the entire length (both the straight as well as the curved portions) of the auger 120. In certain embodiments, the auger 120 may comprise a straight section at the intake end 111, a straight section at the discharge end 112, and a curved section between the intake 111 and discharge 112 ends. In an exemplary embodiment, each section may be approximately 4 feet long, or any suitable length. For example, approximately 4 feet of auger 120 at the intake end 111 may be straight (e.g., 12-4 inch auger sections 120 optionally slid in succession onto a single 4 foot hex rod tube 131). Similarly, approximately 4 feet of auger 120, or any suitable length, at the discharge end 112 may also be straight (e.g., 12-4 inch auger sections 120 optionally slid in succession onto a single 4 foot hex rod tube 131). Each of these 4 foot sections may optionally be comprised of a 4 foot section of straight metal hex tubing 131. The approximately 4 foot section of curved auger 120 may be comprised of, for example, 12-4 inch modular sections. Each of the center modular auger sections 120 may optionally be slid over a short section (e.g., 3.5 inches) of hex rod tube 131. Each of the adjacent auger sections 120 of the center curved section may be connected by hex rods 132.

Referring again to FIG. 2, the auger 120 may comprise a sand-screw auger bit 123 attached at the intake end 111 of the auger 120 by a pipe sleeve 124 using set screws, or any suitable attachment mechanism. The sand-screw auger bit 123 may extend out of the housing 110 and may be operable to bore into the bottom of the edge of a sand pile 1. In various embodiments, the approximately two feet of auger 120 adjacent to the sand-screw auger bit 123 may be exposed to the sand 1 above. For example, as shown in FIG. 3 and described below, the intake end 111 of the housing 110 may include an intake top-side opening 111a that exposes the top side of a portion of the auger 120 at the intake end 111. For example, the housing 110 at the intake end 111 may be generally semicircle shaped to provide the intake top-side opening 111a, whereas the remaining portion of the housing extending from the intake top-side opening 111a to the discharge end 112 is a generally circular tube having a large portion of the auger 120 disposed therein.

The sand-screw auger bit 123, when rotating along with the auger 120, provides boring motion to screw or bore itself into the bottom of the edge of the sand pile 1. In various embodiments, the boring effect of the sand-screw auger bit 123 may pull the apparatus 100 into the outer, bottom, edge of the sand pile 1. In certain embodiments, the operators of the apparatus 100 may coax the apparatus 100 further under the pile 1 using the handles 114 on the sides of the housing 110, as illustrated in FIG. 3. In an exemplary embodiment, the intake end 111 of the apparatus 100 is positioned horizontally, rather than an upward angle, to enhance the ability of the sand-screw auger bit 123 of the auger 120 to penetrate the sand pile 1. Once the intake end 111 of the apparatus is far enough into the pile 1 (e.g., 2-3 feet), the spinning motion of the auger 120 may not be able to advance the assembly 100 any farther into the pile 1 because of increasing friction created by the weight of the sand above it and the ground or concrete slab below it. Accordingly, the spinning motion of the auger 120 may then begin pulling a constant flow of sand 1 into the auger 120. In various embodiments, the spinning motion of the sand-screw auger bit 123 may also serve to agitate the sand near the intake end 111 of the auger 120, thereby reducing the possibility of the bulk sand "bridging" over the end of the auger 120. In an exemplary embodiment, additional sand bagging apparatuses 100 may be positioned adjacent to the first apparatus 100 to increase output and reduce the likelihood of sand "bridging" over the intake end 111. In certain embodiments, the boring ability of the auger 120 obviates the need for a front end loader (or shovels) to "feed" sand into the intake end 111 of the apparatus 100.

The exemplary sand bagging apparatus 100 illustrated in FIG. 2 shares various characteristics with the exemplary sand bagging apparatus 100 illustrated in FIG. 1 as described above.

Figure 5:
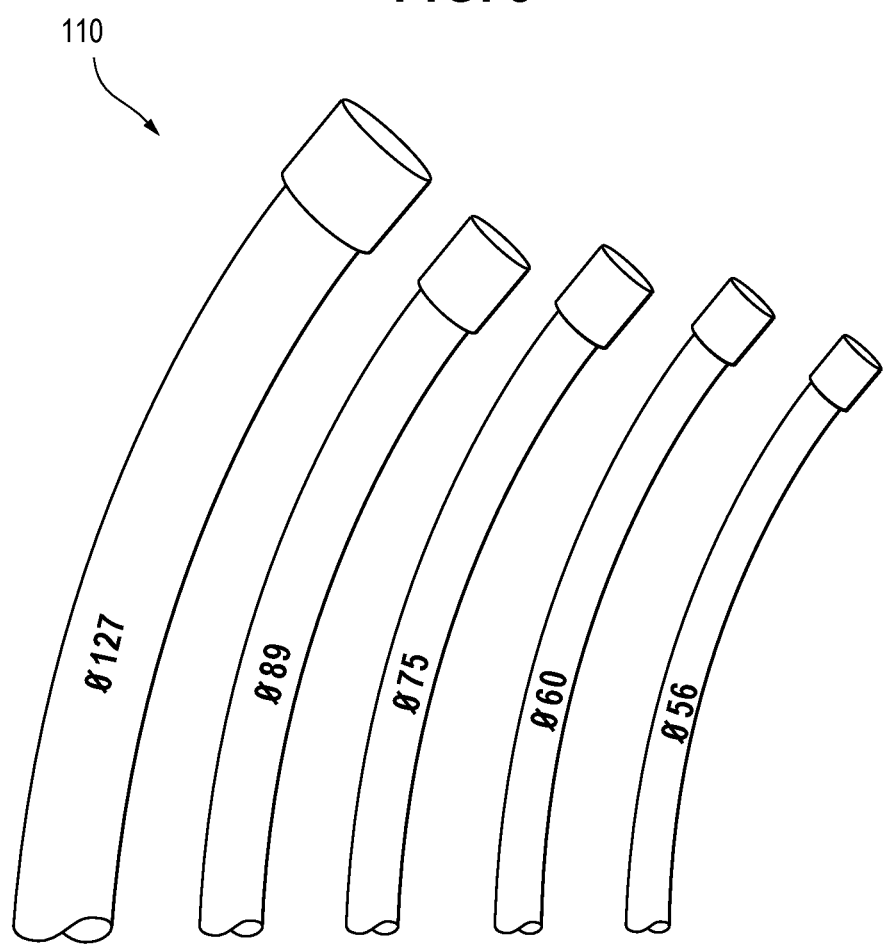
FIG. 5 is a perspective view of exemplary curved auger housings in accordance with various embodiments.

FIG. 3 is a side elevation view of exemplary exterior components of a sand bagging apparatus 100 in accordance with various embodiments. Referring to FIG. 3, the exemplary exterior components may comprise a housing 110, a safety cage 160, and a support frame assembly 150. The housing 110 comprises an intake end 111 and a discharge end 112. The housing 110 may be a hollow pipe or tube having straight portions at the intake 111 and discharge 112 ends and a curved section between the straight portions. The housing 110 may be polyvinyl chloride (PVC) or any suitable material. For example, the housing 110 may be a six inch diameter PVC pipe having a permanently curved gentle bend in the center section (e.g., providing an approximately 10 foot radius). FIG. 5 is a perspective view of exemplary curved auger housings 110 in accordance with various embodiments.

Referring again to FIG. 3, at least a portion of the auger 120 and the motor 140, described above in reference to FIG. 2, may be disposed in the housing 110. The discharge end 112 may comprise a discharge chute 113 for guiding sand into waiting sandbags. In various embodiments, the discharge end 112 of the auger 120 may be approximately 4 feet above ground level, and approximately 10 feet from the edge of the sand pile 1. The intake end 111 of the housing 110 may include an intake top-side opening 111a that may be a semicircle-shaped portion of the housing 110 that provides an exposed top portion for receiving sand. In various embodiment, a portion of the auger 120 may be provided in the top-side opening 111a to pull the sand into the auger 120 and the enclosed, circular portion of the housing 110. In certain embodiments, the exemplary exterior components may comprise a safety cage 160 configured to be affixed to the intake end 111 of the housing at the intake top-side opening 111a. The safety cage 160 may be metal or any suitable material. The safety cage 160 may comprise openings sized to allow sand to fall into the auger 120. The safety cage 160 may have a diameter sized to prevent operators from contacting the moving auger 120 and/or the sand-screw auger bit 123. For example, the diameter of the safety cage 160 may be approximately 10 inches (defined as 8-10 inches) or any suitable diameter to accomplish the desired safety considerations. The auger 120, when operational, rotates and conveys sand through the housing 110 from the intake end 111, where the intake end 111 is underneath the edge of a pile of bulk sand 1, to the discharge end 112, which may be approximately 4 feet above ground, for example. The auger's housing 110 allows bulk material to be conveyed through its gentle bend nearly as efficiently as it is conveyed in a linear application. In various embodiments, controls 141 for the motor 140 may be located near the underside of the auger housing 110 proximate to the discharge chute 113, so that the operator can also position the sandbags under the chute 113.

The support frame assembly 150 may comprise support frame members 151, brackets 152, and wheels 153, 154, among other things. The outside of the housing 110 near the discharge end 112 may be attached to support frame members 151 by brackets 152. The outside of the housing 110 near the intake end 111 may be attached to support frame members 151 by brackets 152. The support frame members 151 near the discharge end 112 may be connected to rear wheels 153. The rear wheels 153 may include 24 inch tires or any suitably-sized tire. The support frame members 151 near the intake end 111 may be connected to front wheels 154. The front wheels 154 may include 12 inch tires or any suitably-sized tire. The front 154 and rear 153 wheels may be attached to each other via support frame members 151. The front 154 and rear 153 pairs of wheels may straddle the center of gravity of the apparatus 100 (e.g., front to back and side to side) to provide balance and support for the apparatus 100. The front 154 and rear 153 wheels may allow the apparatus 100 to be moved. For example, handles 114 on each side of the auger's housing 110 may allow the operators to more easily position the wheeled 153, 154 apparatus 100 so that the intake end 111 of the auger 120 (horizontal and on the concrete slab) can be directed towards the bottom center of a pile of bulk sand 1. As another example, the apparatus 100 may be pulled forward on the wheels 153, 154 when the sand-screw auger bit 123, rotating along with the auger 120, provides boring motion to screw or bore itself into the bottom of the edge of the sand pile 1.

The exemplary sand bagging apparatus 100 illustrated in FIG. 3 shares various characteristics with the exemplary sand bagging apparatus 100 illustrated in FIGS. 1-2 as described above.

FIG. 4 is a side sectional view of the intersection of auger segments 120 in accordance with various embodiments. Referring to FIG. 4, the auger segments 120 comprise a shaft 121, flightings 122, and a hex rod assembly 130. The hex rod assembly 130 comprises hex rods 132, an attachment mechanism 133, and in at least some embodiments, hex rod tubes 131. Although FIG. 4 illustrates hex rod tubes 131, in various embodiments, the sand bagging apparatus 100 may be implemented without the hex rod tubes 131. The attachment mechanism 133 may be a bolt, cotter pin, or any suitable attachment mechanism. The hex rods 132 may be solid hexagon-shaped rod sections or hexagon-shaped tube sections having sufficient rigidity to impart rotational force on the auger segments 120. In certain embodiments, the hex rod tubes 131 may be hollow hexagon-shaped tube sections. As shown in FIG. 4, each set of 2 adjoining "vertebrae" may include either an auger section 120 or, optionally, an auger section 120 slid over the hex rod tube 131. The "vertebrae" 120, 131 may be joined by a "disc" (e.g., the hex rod 132). The "discs" 132 may be anchored inside the adjoining "vertebrae" 120, 131 via bolts or cotter pins 133 as described below. In various embodiments, the hex rod tubes 131 may be 3.5 inches long, the auger segments 120 may be 4 inches long, and the hex rods 132 may be 3 inches long, however, longer and shorter lengths of each of the components 120, 131, 132 are contemplated. Moreover, although the hex rods 132 in FIG. 4 are shown as extending a small amount into each auger segment 120, the hex rods 132 may each extend more or less into the each auger segment 120. For example, the hex rods 132 may extend up to about halfway into each auger segment 120 such that each hex rod 132 is abutting at least one other adjacent hex rod 132.

In various embodiments, the hex rods (the discs) 132 may simultaneously hold the hex rod tubes 131 close together but slightly separated. Each of the auger sections 120 in the curved section may be touching its adjacent auger section 120 and the end surfaces of the auger sections 120 may be able to slide and flex as the auger sections 120 compete for space with adjoining auger sections 120 irrespective of whether hex rod tubes 131 are implemented. In various embodiments implementing the hex rod tubes 131, the neighboring sections of hex rod tubes 131 do not touch.

The hex rods ("discs") 132 may extend approximately 1.5 inches into the end of each of the "vertebrae" 120, 131. The hex rod 132 may be secured with an attachment mechanism 133, such as a bolt or a cotter pin 133 that extends through the shaft 121 of the auger segment 120, the hex rod 132, and the hex rod tube 131 (in embodiments utilizing the hex rod tube 131). The hex rods 132 may be 1.000 to 1.375 inches in diameter (flat surface to flat surface), or any suitable diameter depending on whether the hex rod tubes 131 are used. As an example, the hex rods 132 may be 1.125 inches in diameter if a hex rod tube 131 is used and 1.25 inches in diameter in embodiments without the hex rod tube 131. The hex rods 132 may be slid into the end of the sections of the auger segment 120 and/or the hex rod tube 131, the inside diameter of which may be 1.375 inches or any suitable diameter for the auger segment 120 and/or 1.2 inches or any suitable diameter for the hex rod tube 131 if implemented. The hex rods 132 are then secured to the auger segment 120 and/or hex rod tube 131 with the attachment mechanism 133. The snug fit is designed to provide the hex rods 132 with a small amount of wiggle room inside the auger segment 120 and/or the hex tubing 131. The snug fit provides a small flex (e.g., approximately 1-2 degrees per "vertebra" 120, 131) while still transmitting rotational torque throughout the entire auger due to the snug fit and the attachment mechanism 133. Accordingly, unlike a linear application in which any adjoining sections would be 180 degrees relative to each other, adjoining sections in the curved portion of the auger 120 may be, for example, 178-179 degrees related to each other. In the exemplary embodiment, 12 adjoining sections results in a cumulative curvature of approximately 20 degrees. Although the flex above is defined as 1-2 degrees in an embodiment, larger and smaller flex values are contemplated.

Still referring to FIG. 4, the attachment mechanism 133 may be fitted into a hole drilled vertically through the shaft 121 of the auger section, the hex tube 131 (optionally), and the hex rod 132. The flex between adjoining sections may be minimal, where the majority of the flex at the intersection of the vertical attachment mechanism 133 may be from side to side. The next attachment mechanism 133 in succession may be fitted into a hole drilled horizontally through the shaft 121 of the auger section, the hex tube 131 (optionally), and the hex rod 132. The flex between adjoining sections may be minimal, where the majority of the flex at the intersection of the horizontal attachment mechanism 133 may be up and down. Successive attachment mechanisms 133 may alternate between vertical and horizontal, providing a smooth transmission of flex between each set of "vertebrae" 120, 131 as the sets of auger sections 120 and/or hex tubes 131 rotate in unison.

In various embodiments, the hex rods 132 may be slightly tapered to increase the flexing characteristic of the adjoining sections 120, 131 without compromising the transmission of rotational torque. The rotational torque generated by the motor 140 at the discharge end 112 is transferred along the entire length of the auger 120 based at least in part on the anchoring effect of the attachment mechanisms 133 and the snug, albeit imperfect, fit between hex rods 132 and the adjacent auger section 120 and/or the optional hex tube 131.

The exemplary auger segments 120 illustrated in FIG. 4 shares various characteristics with the exemplary auger segments 120 illustrated in FIGS. 1-2 as described above.

Figure 6:
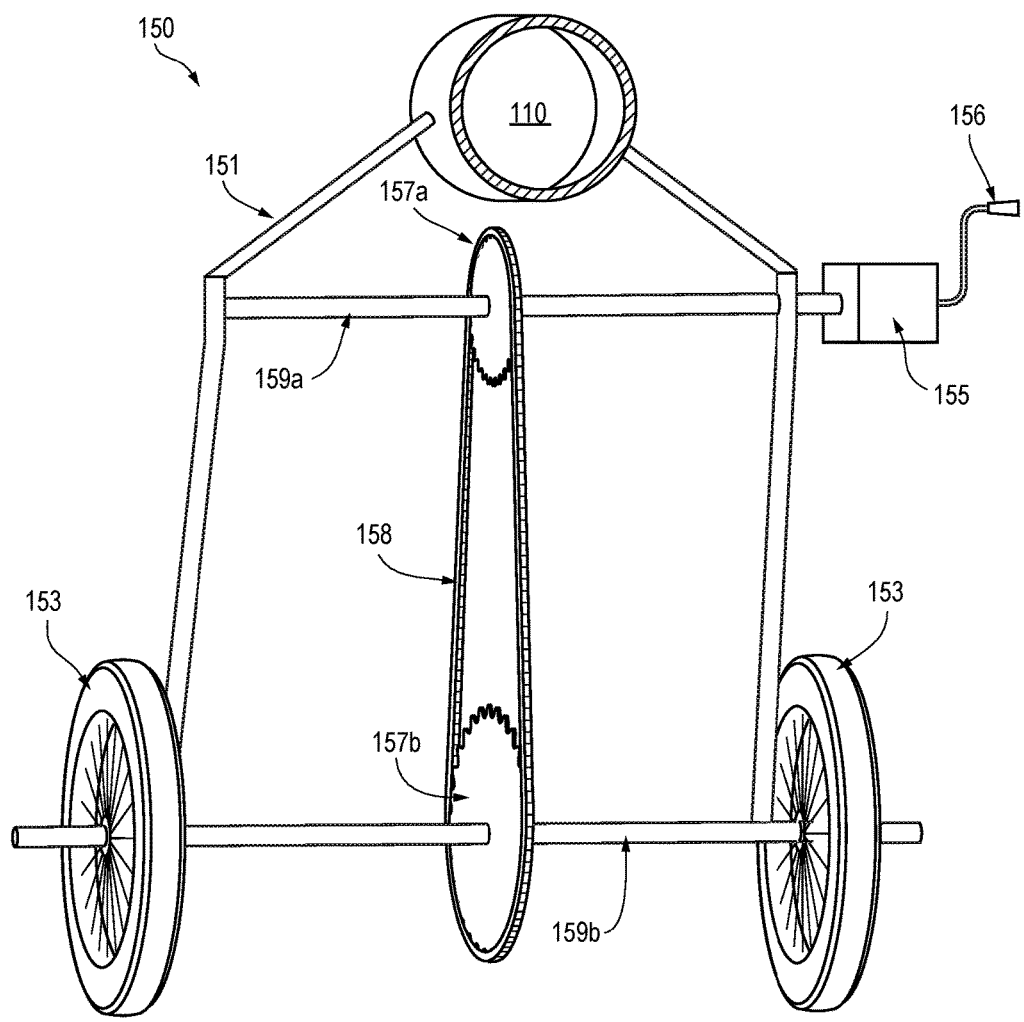
FIG. 6 is a perspective view of an exemplary support frame assembly in accordance with various embodiments.

FIG. 6 is a perspective view of an exemplary support frame assembly 150 in accordance with various embodiments. Referring to FIG. 6, the support frame assembly comprises support frame members 151, wheels 153, gear box 155, rotation source 156, pulleys 157*a,b*, pulley belt/chain 158, and lower and upper axle bars 159*a,b*, among other things. The support frame members 151 may be connected to the auger housing 110 and wheels 153. In various embodiments, the support frame assembly 150 may include two hexagon shaped cross-bars 159*a,b*. The upper axle bar 159*a* may be rotated via a motor, a crank with a slip handle 156, or any suitable mechanism configured to rotate the upper axle bar 159*a*. The upper axle bar 159*a* may be connected to a speed reducing gear box with a clutch release 155. The speed reducing gear box with clutch release 155 may enable the operator to provide slow, steady, supplemental propulsion to the apparatus 100, for example, either into, or out of, a sand pile 1 if the clutch is engaged. For example, for every 5 revolutions, or any suitable number of revolutions, of a motor or the crank 156, the upper axle bar 159*a* may rotate once. The rotation of the upper axle bar 159*a* may rotate the lower axle bar 159*b* via a pulley system comprising pulleys 157*a,b* and belt/chain 158. The lower axle bar 159*b* may serve as the axle for both wheels 153. In various embodiments, the gear box with clutch release 155 may operate in the speed reducing mode described above if the clutch is engaged. Additionally and/or alternatively, the apparatus 100 may be disengaged from the speed reducing mode if the clutch is released so that, for example, the apparatus 100 may be pushed into position in a "freewheeling" manner.

The exemplary support frame assembly 150 illustrated in FIG. 6 shares various characteristics with the exemplary support frame assembly 150 illustrated in FIG. 3 as described above.

In various embodiments, the sand bagging apparatus 100 may be connected in tandem, side-by-side, to a second sand bagging apparatus 100 to double the output and reduce the likelihood of bridging at the intake end 111 of the sand bagging systems 100. In an exemplary embodiment having two sand bagging systems 100, the augers 120 of each apparatus 100 may be different lengths to avoid the discharge chutes 113 and therefore the operators, competing for the same space. For example, a longer horizontal auger section 120 may be implemented in the second assembly 100 to provide the differing auger 120 lengths.

FIG. 7 is a flow diagram 200 that illustrates exemplary steps 202-208 for filling sandbags by a sand bagging apparatus 100 in accordance with various embodiments. Referring to FIG. 7, there is shown a flow chart 200 comprising exemplary steps 202 through 208. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order than listed below, including but not limited to simultaneously. Although the method is described with reference to the exemplary elements of the system 100 described above, it should be understood that other implementations are possible.

At step 202, a horizontal intake end 111 of a sand bagging apparatus 100 may be positioned toward a bottom center of a pile of bulk sand 1. At step 204, a motor 140 of the sand bagging apparatus 100 may be activated to rotate an auger 120 of the apparatus 100. The rotation of the auger 120 may cause a sand-screw auger bit 123 at the intake end 111 of the apparatus 100 to penetrate the sand pile 1. The boring of the sand-screw auger bit 123 into the sand pile 1 may pull the apparatus 100 into an outer, bottom, edge of the sand pile 1. At step 206, sand from the sand pile 1 may be pulled into the auger 120. The auger 120 may pass the sand through a horizontal intake end 111, a curved central portion, and to a discharge end 112 having a discharge chute 113. At step 208, the discharge chute 113 may guide the sand into waiting sandbags.

Various embodiments provide a sand bagging apparatus 100 that may comprise a hollow housing tube 110 having an intake end 111, a curved central portion, and a discharge end 112. The apparatus 100 may comprise an auger 120 comprising a shaft 121 and flightings 122. The auger 120 may be at least partially disposed within the hollow housing tube 110. The auger 120 may comprise a first end connected to a motor 140 at the discharge end 112 of hollow housing tube 110 and a second end connected to a sand-screw auger bit 123 at the intake end 111 of the housing tube 110. The auger 120 may comprise a plurality of connected auger sections. A portion of the plurality of connected auger sections may be disposed in the curved central portion of the hollow housing tube 110 and may be flexibly connected. The motor 140 may be operable to transmit rotational torque through an entire length of the auger 120.

In a representative embodiment, the hollow housing tube 110 may comprise a discharge chute 113 at the discharge end 112. In certain embodiments, the auger 120 may comprise a straight section at the intake end 111 of the housing tube 110. The straight section may comprise the second end connected to the sand screw auger bit 123. The straight section may be coupled to one end of the portion of the plurality of connected auger sections disposed in the curved central portion of the hollow housing tube 110. In various embodiments, the auger 120 comprises a straight section at the discharge end 112 of the housing tube 110. The straight section may comprise the first end connected to the motor 140. The straight section may be coupled to one end of the portion of the plurality of connected auger sections disposed in the curved central portion of the hollow housing tube 110.

In certain embodiments, each of the portion of the plurality of connected auger sections are connected to at least one other of the portion of the plurality of connected auger sections by a rod 132 that extends into two adjacent sections of the portion of the plurality of connected auger sections. In various embodiments, the portion of the plurality of connected auger sections comprises a hexagon shaped hollow core 121 having a flat-to-flat inner diameter. The rod 132 is hexagon shaped and comprises a flat-to-flat outer diameter that is less than the flat-to-flat inner diameter of the portion of the plurality of connected auger sections. In a representative embodiment, an attachment mechanism 133 secures the rod 132 to each of the two adjacent sections of the portion of the plurality of connected auger sections. In certain embodiments, the attachment mechanism 133 is a cotter pin that extends through each of the two adjacent sections of the portion of the plurality of connected auger sections and the rod 132. In a representative embodiment, a first cotter pin 133 extends horizontally through a first end of the rod 132 and through a first one of the two adjacent sections of the portion of the plurality of connected auger sections 120. A second cotter pin 133 extends vertically through a second end of the rod 132 and through a second one of the two adjacent sections of the portion of the plurality of connected auger sections 120.

In various embodiments, the apparatus 100 comprises a rod tube 131. The rod tube 131 is a hexagon shaped hollow tube having a flat-to-flat inner diameter and a flat-to-flat outer diameter. The flat-to-flat outer diameter of the rod tube 131 is less than or equal to the flat-to-flat inner diameter of the portion of the plurality of connected auger sections 120. The flat-to-flat inner diameter of the rod tube 131 is greater than the flat-to-flat outer diameter of the rod 132.

Certain embodiments provide a method 200 for filling a sandbag. The method 200 may comprise positioning 202 a horizontal intake end 111 of a sand bagging apparatus 100 toward a bottom center of a sand pile 1 in a horizontal orientation. The method 200 may comprise activating 204 a motor 140 of the sand bagging apparatus 100 to rotate an auger 120 of the sand bagging apparatus 100. The rotation of the auger 120 may rotate a sand-screw auger bit 123 positioned horizontally at the horizontal intake end 111 of the sand bagging apparatus 100. The rotation of the sand-screw auger bit 123 may bore the sand-screw auger bit 123 into the sand pile 1 and pull the sand bagging apparatus 100 toward the sand pile 1. The method 200 may comprise pulling 206 sand from the sand pile 1 into the auger 120. The auger 120 may pass the sand through the horizontal intake end 111, a curved central portion, and to a discharge end 112

In various embodiments, the discharge end 112 comprises a discharge chute 113. In a representative embodiment, the method 200 comprises guiding 208 the sand out of the sand bagging apparatus 100 at the discharge chute 113. In certain embodiments, the auger 120 comprises a straight section at the horizontal intake end 111. The straight section may comprise a first end connected to the sand-screw auger bit 123 and a second end coupled to the portion of the plurality of connected auger sections at the curved central portion. In various embodiments, the auger 120 comprises a straight section at the discharge end 112. The straight section may comprise a first end connected to the motor 140 and a second end coupled to the portion of the plurality of connected auger sections at the curved central portion.

In a representative embodiment, each of the portion of the plurality of connected auger sections are connected to at least one other of the portion of the plurality of connected auger sections by a rod 132 that extends into two adjacent sections of the portion of the plurality of connected auger sections. In certain embodiments, an attachment mechanism 133 secures the rod 132 to each of the two adjacent sections of the portion of the plurality of connected auger sections. The attachment mechanism 133 may be a cotter pin that extends through each of the two adjacent sections of the portion of the plurality of connected auger sections 120 and the rod 132. In various embodiments, a first cotter pin 133 extends horizontally through a first end of the rod 132 and through a first one of the two adjacent sections of the portion of the plurality of connected auger sections 120. A second cotter pin 133 may extend vertically through a second end of the rod 132 and through a second one of the two adjacent sections of the portion of the plurality of connected auger sections 120.

In certain embodiments, the portion of the plurality of connected auger sections 120 comprises a hexagon shaped hollow core 121 having a flat-to-flat inner diameter. The rod 132 is hexagon shaped and comprises a flat-to-flat outer diameter that is less than the flat-to-flat inner diameter of the portion of the plurality of connected auger sections 120. In a representative embodiment, a rod tube 131 is disposed within each of the portion of the plurality of connected auger sections 120. The rod tube 131 may be a hexagon shaped hollow tube having a flat-to-flat inner diameter and a flat-to-flat outer diameter. The flat-to-flat outer diameter of the rod tube 131 may be less than or equal to the flat-to-flat inner diameter of the portion of the plurality of connected auger sections 120. The flat-to-flat inner diameter of the rod tube 131 may be greater than the flat-to-flat outer diameter of the rod 132.

As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g." and "for example" set off lists of one or more non-limiting examples, instances, or illustrations.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment or embodiments disclosed, but that the present disclosure will include all embodiments falling within the scope of the appended claims.

What is claimed is:

1. A sand bagging apparatus comprising:
   a hollow housing tube having an intake end, a curved central portion, and a discharge end;
   an auger comprising a shaft and flightings, the auger at least partially disposed within the hollow housing tube, the auger having a first end connected to a motor at the discharge end of hollow housing tube and a second end connected to a sand screw auger bit at the intake end of the housing tube, the auger comprising a plurality of connected auger sections, wherein a portion of the plurality of connected auger sections is disposed in the curved central portion of the hollow housing tube and is flexibly connected; and
   the motor operable to transmit rotational torque through an entire length of the auger.

2. The apparatus of claim 1, wherein the hollow housing tube comprises a discharge chute at the discharge end.

3. The apparatus of claim 1, wherein the auger comprises a straight section at the intake end of the housing tube, the straight section comprising the second end connected to the sand screw auger bit, and wherein the straight section is coupled to one end of the portion of the plurality of connected auger sections disposed in the curved central portion of the hollow housing tube.

4. The apparatus of claim 1, wherein the auger comprises a straight section at the discharge end of the housing tube, the straight section comprising the first end connected to the motor, and wherein the straight section is coupled to one end of the portion of the plurality of connected auger sections disposed in the curved central portion of the hollow housing tube.

5. The apparatus of claim 1, wherein each of the portion of the plurality of connected auger sections are connected to at least one other of the portion of the plurality of connected auger sections by a rod that extends into two adjacent sections of the portion of the plurality of connected auger sections.

6. The apparatus of claim 5, wherein the portion of the plurality of connected auger sections comprises a hexagon shaped hollow core having a flat-to-flat inner diameter, and wherein the rod is hexagon shaped and comprises a flat-to-flat outer diameter that is less than the flat-to-flat inner diameter of the portion of the plurality of connected auger sections.

7. The apparatus of claim 6, comprising a rod tube, wherein:
   the rod tube is a hexagon shaped hollow tube having a flat-to-flat inner diameter and a flat-to-flat outer diameter,
   the flat-to-flat outer diameter of the rod tube is less than or equal to the flat-to-flat inner diameter of the portion of the plurality of connected auger sections, and
   the flat-to-flat inner diameter of the rod tube is greater than the flat-to-flat outer diameter of the rod.

8. The apparatus of claim 5, wherein an attachment mechanism secures the rod to each of the two adjacent sections of the portion of the plurality of connected auger sections.

9. The apparatus of claim 8, wherein the attachment mechanism is a cotter pin that extends through each of the two adjacent sections of the portion of the plurality of connected auger sections and the rod.

10. The apparatus of claim 9, wherein a first cotter pin extends horizontally through a first end of the rod and through a first one of the two adjacent sections of the portion of the plurality of connected auger sections, and wherein a second cotter pin extends vertically through a second end of the rod and through a second one of the two adjacent sections of the portion of the plurality of connected auger sections.

11. A method for filling a sandbag comprising:
   positioning a horizontal intake end of a sand bagging apparatus toward a bottom center of a sand pile in a horizontal orientation;
   activating a motor of the sand bagging apparatus to rotate an auger of the sand bagging apparatus, the rotation of the auger rotating a sand-screw auger bit positioned horizontally at the horizontal intake end of the sand bagging apparatus, wherein the rotation of the sand-screw auger bit bores the sand-screw auger bit into the sand pile and pulls the sand bagging apparatus toward the sand pile;

pulling sand from the sand pile into the auger, the auger passing the sand through the horizontal intake end, a curved central portion, and to a discharge end, wherein the auger comprises a plurality of connected auger sections, and wherein a portion of the plurality of connected auger sections is flexibly connected at the curved central portion.

12. The method of claim 11, wherein the discharge end comprises a discharge chute.

13. The method of claim 12, comprising guiding the sand out of the sand bagging apparatus at the discharge chute.

14. The method of claim 11, wherein the auger comprises a straight section at the horizontal intake end, the straight section comprising a first end connected to the sand-screw auger bit and a second end coupled to the portion of the plurality of connected auger sections at the curved central portion.

15. The method of claim 11, wherein the auger comprises a straight section at the discharge end, the straight section comprising a first end connected to the motor and a second end coupled to the portion of the plurality of connected auger sections at the curved central portion.

16. The method of claim 11, wherein each of the portion of the plurality of connected auger sections are connected to at least one other of the portion of the plurality of connected auger sections by a rod that extends into two adjacent sections of the portion of the plurality of connected auger sections.

17. The method of claim 16, wherein an attachment mechanism secures the rod to each of the two adjacent sections of the portion of the plurality of connected auger sections and wherein the attachment mechanism is a cotter pin that extends through each of the two adjacent sections of the portion of the plurality of connected auger sections and the rod.

18. The method of claim 17, wherein a first cotter pin extends horizontally through a first end of the rod and through a first one of the two adjacent sections of the portion of the plurality of connected auger sections, and wherein a second cotter pin extends vertically through a second end of the rod and through a second one of the two adjacent sections of the portion of the plurality of connected auger sections.

19. The method of claim 16, wherein the portion of the plurality of connected auger sections comprises a hexagon shaped hollow core having a flat-to-flat inner diameter, and wherein the rod is hexagon shaped and comprises a flat-to-flat outer diameter that is less than the flat-to-flat inner diameter of the portion of the plurality of connected auger sections.

20. The method of claim 11, wherein:
a rod tube is disposed within each of the portion of the plurality of connected auger sections,
the rod tube is a hexagon shaped hollow tube having a flat-to-flat inner diameter and a flat-to-flat outer diameter,
the flat-to-flat outer diameter of the rod tube is less than or equal to the flat-to-flat inner diameter of the portion of the plurality of connected auger sections, and
the flat-to-flat inner diameter of the rod tube is greater than the flat-to-flat outer diameter of the rod.

* * * * *